(12) United States Patent
Steed

(10) Patent No.: US 11,964,353 B2
(45) Date of Patent: Apr. 23, 2024

(54) MACHINE DEBRIS CLEAN OUT SYSTEM

(71) Applicant: Leen David Steed, Lake Country (CA)

(72) Inventor: Leen David Steed, Lake Country (CA)

(*) Notice: Subject to any disclaimer, the term of this patent is extended or adjusted under 35 U.S.C. 154(b) by 637 days.

(21) Appl. No.: 16/925,914

(22) Filed: Jul. 10, 2020

(65) Prior Publication Data
US 2021/0008679 A1 Jan. 14, 2021

Related U.S. Application Data

(60) Provisional application No. 62/872,613, filed on Jul. 10, 2019.

(51) Int. Cl.
*B23Q 11/00* (2006.01)

(52) U.S. Cl.
CPC ...... *B23Q 11/0042* (2013.01); *B23Q 11/0053* (2013.01); *B23Q 11/0067* (2013.01); *B23B 2270/30* (2013.01)

(58) Field of Classification Search
CPC ............ B23Q 11/0042; B23Q 11/0053; B23Q 11/0067; B23Q 11/0057; B23Q 1/015; B23B 2270/30; Y10T 409/304088; Y10T 408/44
See application file for complete search history.

(56) References Cited

U.S. PATENT DOCUMENTS

| | | | | |
|---|---|---|---|---|
| 2,760,387 A * | 8/1956 | Wade | ................ | B23Q 11/1084 408/136 |
| 3,098,332 A * | 7/1963 | Sutton | .................... | B24B 55/06 15/346 |
| 3,785,227 A * | 1/1974 | Wolff | ....................... | B23Q 1/01 82/149 |
| 5,078,256 A * | 1/1992 | Hatano | .............. | B23Q 3/15513 409/137 |
| 5,147,161 A * | 9/1992 | Whiting | ................. | B23Q 11/10 408/61 |
| 5,205,686 A * | 4/1993 | de Caussin | ........ | B23Q 11/0057 409/137 |
| 5,611,137 A * | 3/1997 | Braun | .................... | B23Q 1/626 409/137 |
| 5,683,210 A * | 11/1997 | Phillips | ................ | B23Q 11/005 29/DIG. 98 |
| 5,781,983 A * | 7/1998 | Gruner | ................. | B23Q 7/1494 409/164 |
| 6,547,498 B1 * | 4/2003 | Sugata | ............... | B23Q 11/0053 29/DIG. 86 |
| 6,626,285 B2 * | 9/2003 | Enomoto | ............... | B23Q 37/00 198/581 |

(Continued)

*Primary Examiner* — Sara Addisu
(74) *Attorney, Agent, or Firm* — Richard D. Okimaw

(57) ABSTRACT

An apparatus for removing debris from under a machining location is formed of a static collection surface located below the machining location having a transition portion laterally offset from the machining location and a fluid discharge positioned above the transition portion. The fluid discharge includes a fluid source and a reservoir having an interior adapted to receive and contain a quantity of a fluid from the fluid source for a period of time. The fluid sicharge is adapted to periodically discharge the fluid therefrom so as to be guided by the transition portion across the collection surface to sweep the debris off the static collection surface towards a collection point.

13 Claims, 4 Drawing Sheets

(56) References Cited

U.S. PATENT DOCUMENTS

| | | | | |
|---|---|---|---|---|
| 6,745,455 | B2* | 6/2004 | Popp | B23Q 11/0053 409/137 |
| 7,101,269 | B2* | 9/2006 | Wakazono | B24B 41/02 451/449 |
| 7,165,919 | B2* | 1/2007 | Schweizer | B23Q 1/015 82/149 |
| 7,437,816 | B1* | 10/2008 | Kuo | B23Q 11/0053 409/137 |
| 7,647,499 | B2* | 1/2010 | Blair | G06Q 20/341 713/168 |
| 8,307,746 | B2* | 11/2012 | Yamane | B23Q 11/0825 82/149 |
| 8,661,950 | B2* | 3/2014 | Hessbrueggen | B23Q 7/047 82/122 |
| 8,991,288 | B2* | 3/2015 | Watanabe | B23Q 39/023 82/149 |
| 9,694,459 | B2* | 7/2017 | Kakutani | B01D 21/2455 |
| 2005/0031427 | A1* | 2/2005 | Hiramoto | B23Q 11/0057 409/137 |
| 2007/0062348 | A1* | 3/2007 | Saito | B23Q 11/0032 82/149 |
| 2013/0333532 | A1* | 12/2013 | Watanabe | B23Q 11/0032 82/124 |
| 2017/0144262 | A1 | 5/2017 | Okuda | |

* cited by examiner

MACHINE DEBRIS CLEAN OUT SYSTEM

BACKGROUND OF THE INVENTION

1. Field of Invention

The present invention relates generally to machining and in particular to a method and apparatus for removing debris from a machining location.

2. Description of Related Art

Mills and lathes are common machining equipment that is utilized in modern machine shops to form and build a variety of parts. Such machines may be utilized to cut or remove material from a block of raw material to form the finished or intermediate piece. The material thus removed from the raw material is often referred to a cuttings, shavings or chips. Such chips are known to accumulate under the machining location which require frequent removal by an operator.

Conventional methods of removing cuttings from beneath a machining location have not been satisfactory. In particular, traditionally an operator would stop the operation of the tool to remove the chips from thereunder. It will be appreciated that such work stoppage is time consuming to perform resulting in lost productivity. This lost productivity has been exacerbated in recent years with the increasing use of computer numerically controlled (CNC) machines which may operate without significant ongoing operator supervision. In particular, as such CNC machines may be expected to operate for 24 hours a day, the accumulation of chips therein is greatly increased.

One common solution to the build-up of chips has been to provide spray nozzles directing a flow of cutting fluid or the like at the surface under the tool so as to direct or otherwise move the chips to a collection point. Disadvantageously, such nozzles may have difficulty covering the entire area below a machining location and may therefore be prone to leaving piles of chips in the corner of the machine bed or at other locations.

SUMMARY OF THE INVENTION

According to a first embodiment of the present invention there is disclosed an apparatus for removing debris from under a machining location comprising a collection surface located below the machining location having a curved portion laterally offset from the machining location and a fluid discharge positioned above the transition portion adapted to periodically discharge a fluid therefrom so as to be guided by the transition portion across the collection surface to sweep the debris towards a collection point.

The fluid discharge may comprise a reservoir having an interior adapted to contain a quantity of a fluid, a fluid source operable to introduce a quantity of fluid into the reservoir and an actuator operable to transition the reservoir from a first configuration retaining the fluid therein and a second configuration releasing the fluid therefrom.

The reservoir may include an open top. The reservoir may include a pivot support so as to permit the reservoir to be rotated between the first configuration wherein the open top is oriented substantially upward to the second configuration wherein the reservoir is rotated to permit fluid to be discharged through the open top. The actuator may be operable to rotate the reservoir between the first and second positions. The open top of the reservoir may be oriented towards the transition portion in the second configuration.

The fluid discharge may comprise a reservoir having an interior adapted to contain a quantity of a fluid, a fluid source operable to introduce a quantity of fluid into the reservoir and a port extending through the reservoir wherein the port is closed in the first configuration and open in the second configuration. The port may include a valve.

The transition portion may comprise a curved surface. The collection surface may include a rear wall extending substantially upward from the transition portion. The collection surface may include a bottom portion extending from the transition portion under the machining location. The bottom portion may extend from the transition surface to a collection location. The collection location includes a conveyor therein adapted to remove the debris from the machine enclosure.

According to a further embodiment of the present invention there is disclosed a method for removing debris from a machining location comprising introducing a fluid from a fluid source into an interior of a reservoir and periodically discharging the fluid from the interior of the reservoir onto a transition surface positioned offset from the machining location Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
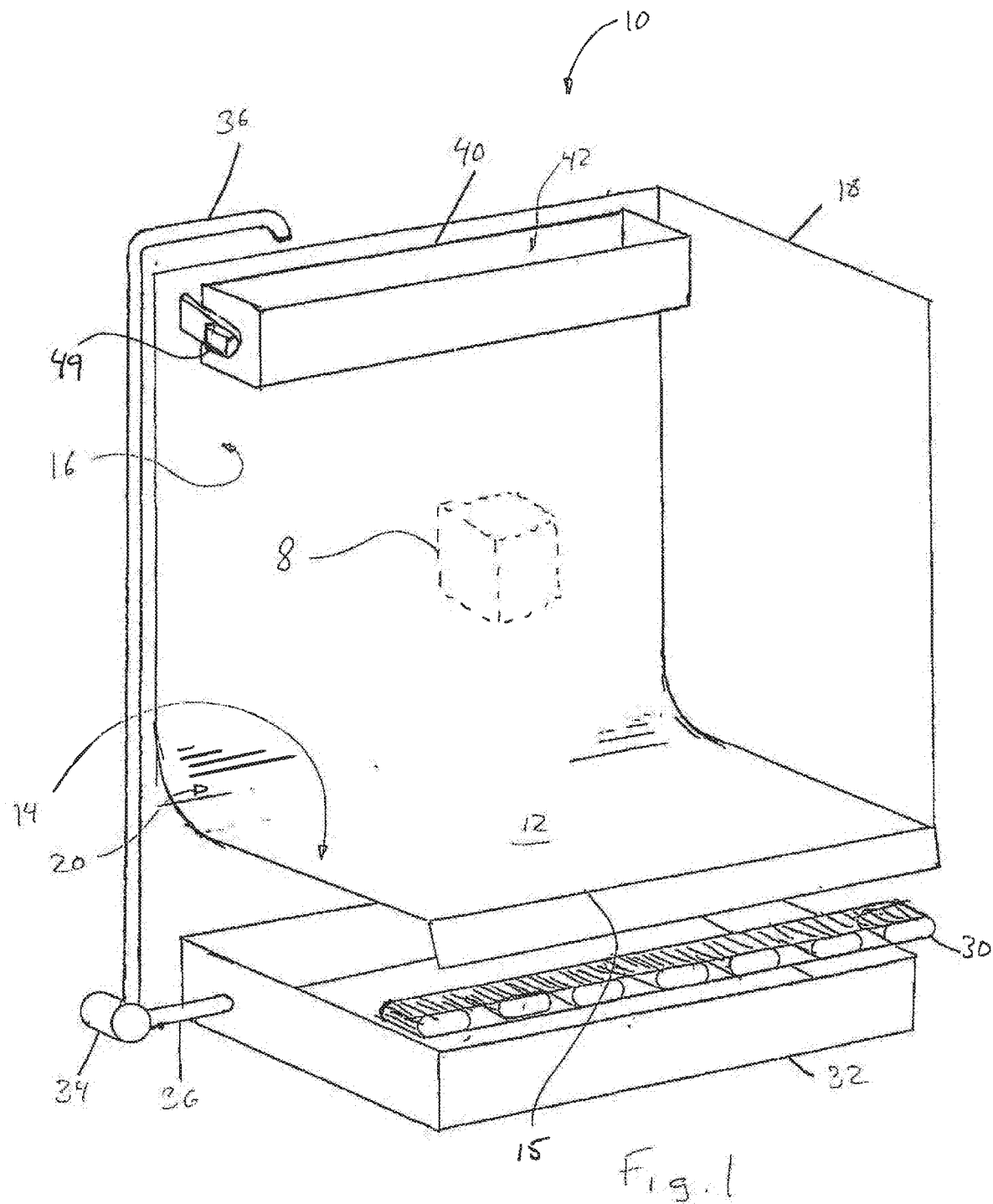
FIG. 1 is a perspective view of a system for removing debris from under a machining location according to a first embodiment of the present invention.

Referring to FIG. 1, an apparatus for removing machining chips according to a first embodiment of the invention is shown generally at 10. The apparatus 10 may be located within or below a machine having a machining location 8. The machining location includes at least one tool (not shown) adapted to perform a machining operation. As utilized herein, machining location refers to any position in which a machining operation is conducted. Such machining operations may be conducted by any known machining tool including but are not limited to mills, lathes, drills and saws. As utilized herein, machining chips shall refer to any portion of material removed from the base material by such machining operations as may be commonly referred to as chips, swarf, turnings, filings or shavings.

Figure 2:
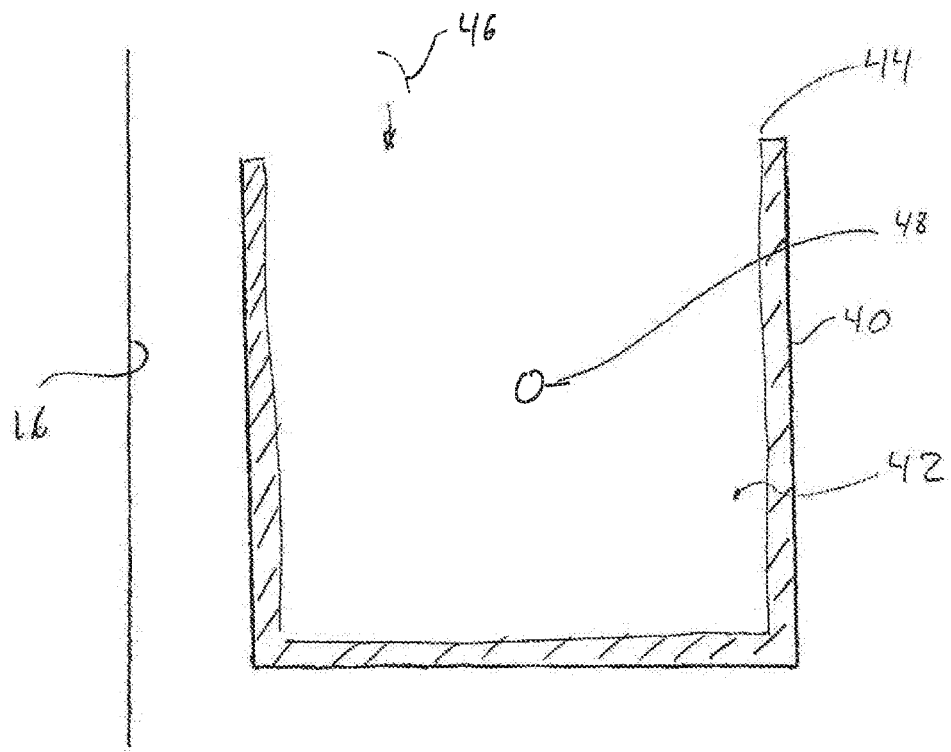
FIG. 2 is a side view of the system of FIG. 1 at a first or filling position.
Figure 3:
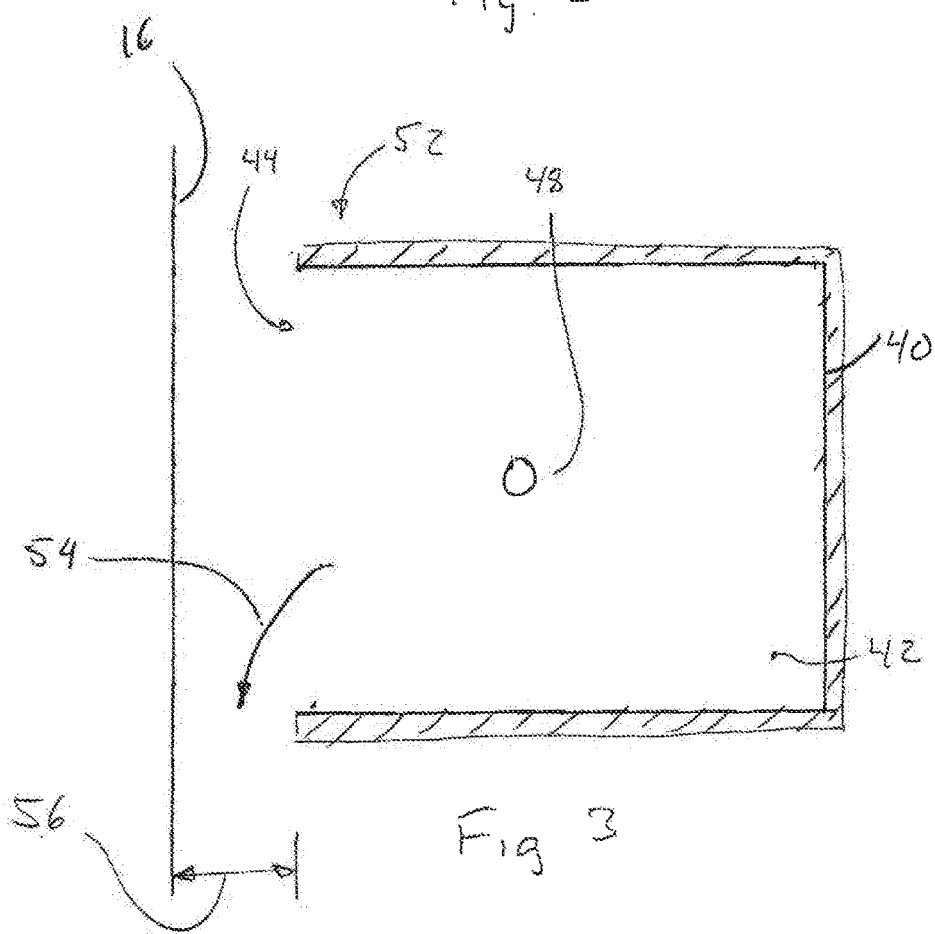
FIG. 3 is a side view of the system of FIG. 1 at a discharge position.
Figure 4:
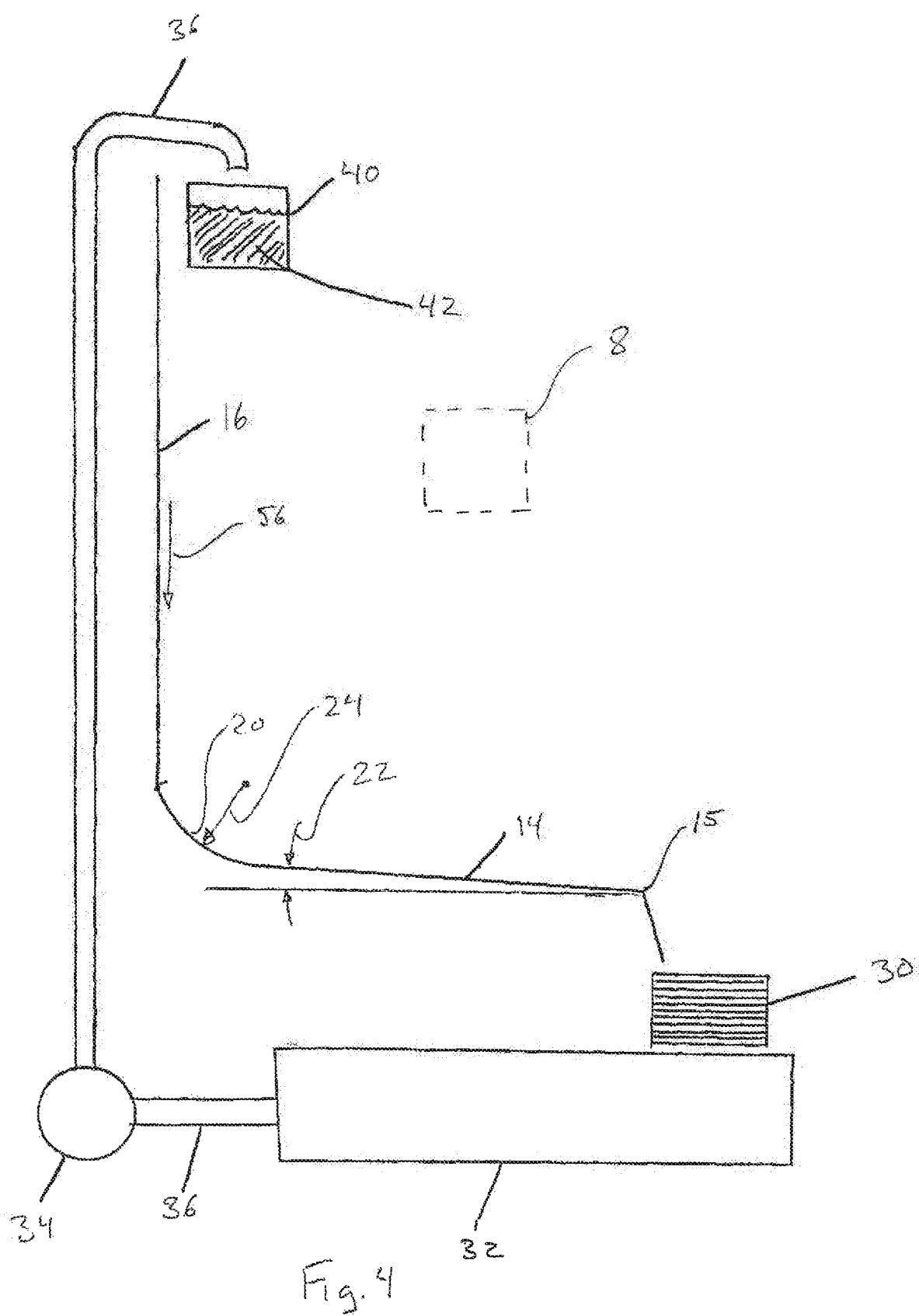
FIG. 4 is a side view of the system of FIG. 1 showing the fluid source and filling system.

The apparatus comprises a receiving surface 12 below the machining location and fluid discharge adapted to receive a fluid from a fluid supply such as a pipe 36 thereabove. As illustrated herein the fluid discharge may comprise a reservoir 40 or 60 adapted to release a quantity of fluid as described below. It will be appreciated that other intermittent fluid release systems may also be useful as well. The receiving surface 12 comprises a planar material preferably having a bottom portion 14 extending to a free distal edge 15 below the machining location 8. As illustrated in FIGS. 1 through 4, the machine may include a rear wall 16 and/or side walls 18 (only one of which is shown in FIG. 1 for clarity). The receiving surface 12 may include a transition portion 20 adjacent to the rear wall 18 so as to be between the rear wall and the bottom portion 14. As illustrated, the transition portion may be curved or arcuate although it may also be angular or a corner intersection of the rear wall 16 and bottom portion 14. The bottom portion 14 may have an angle 22, as illustrated in FIG. 4 and the transition portion 20 may have a radius, generally indicated at 24 so as to optimize the transition from vertical to horizontal movement of the fluid discharged from the reservoir 40. The angle may be selected to be any angle which assists such flow of fluid and similarly, the radius 24 may be selected to be any radius which enhances flow of the fluid between the rear wall and the bottom portion.

As illustrated in FIGS. 1 and 4, the apparatus may optionally include a conveyor belt 30 located below the distal edge 15 of the bottom portion. The conveyor belt is adapted to catch and transport material washed off the distal edge 15 away to a collection point as are commonly known. The apparatus may also optionally include a collection pan 32 or screw style auger.

The reservoir 40 comprises an elongate container extending along a direction substantially parallel to the rear wall 16. As illustrated in FIGS. 1-3, the reservoir 40 includes an interior volume 42 adapted to receive and retain a quantity of fluid through an open top 44 in a direction generally indicated at 46 in FIG. 2. The reservoir 40 includes a pivot support 48 at both sides thereof. As illustrated in FIG. 2, the reservoir 40, when empty will be retained in an upright position or configuration. Once a sufficient quantity of a fluid has been introduced into the interior 42 thereof or when a predetermined time period has elapsed, the reservoir will be tipped or dumped towards the rear wall 16 in a direction generally indicated at 52 to a second position or configuration discharging the fluid in a direction generally indicated at 54. The reservoir may be dumped by any commonly known means such as, by way of non-limiting example, actuators 49 including mechanical solenoids or motors, levers, pulleys, or positioning the center of gravity of the full bucket above the pivot point so as to self-discharge at a predetermined fill level. The reservoir 40 may be spaced apart from the rear wall 16 by a gap distance 56 as illustrated in FIG. 3 such that the fluid discharged therefrom is directed into contact with the rear wall 16 so as to run down the rear wall 16 and onto the transition portion 20. In practice it has been found that a gap distance 56 of an amount sufficient to permit rotation of the reservoir 40 has been useful for this purpose.

As illustrated in FIG. 4, the system 10 may be provided with a pump 34 and piping 36 adapted to convey fluid collected by in the pan 32 to be discharged into the reservoir. In operation, the pump 34 may operate continuously or intermittently according to the desired interval of cleaning the receiving surface 12. As illustrated in FIG. 4, the discharge from the reservoir is directed along or proximate to the rear wall 16 such that the transition portion 20 will direct the flow onto and over the bottom portion 14. This rush or flow of fluid will therefor wash the entire contents of chips or other material collected on the receiving surface 12 over the distal edge and onto the conveyor belt 30 for removal. The fluid may be selected to be any known fluid such as, by way of non-limiting example, water, cutting fluids or lubricants as are commonly known and utilized in such machining operations.

Figure 5:
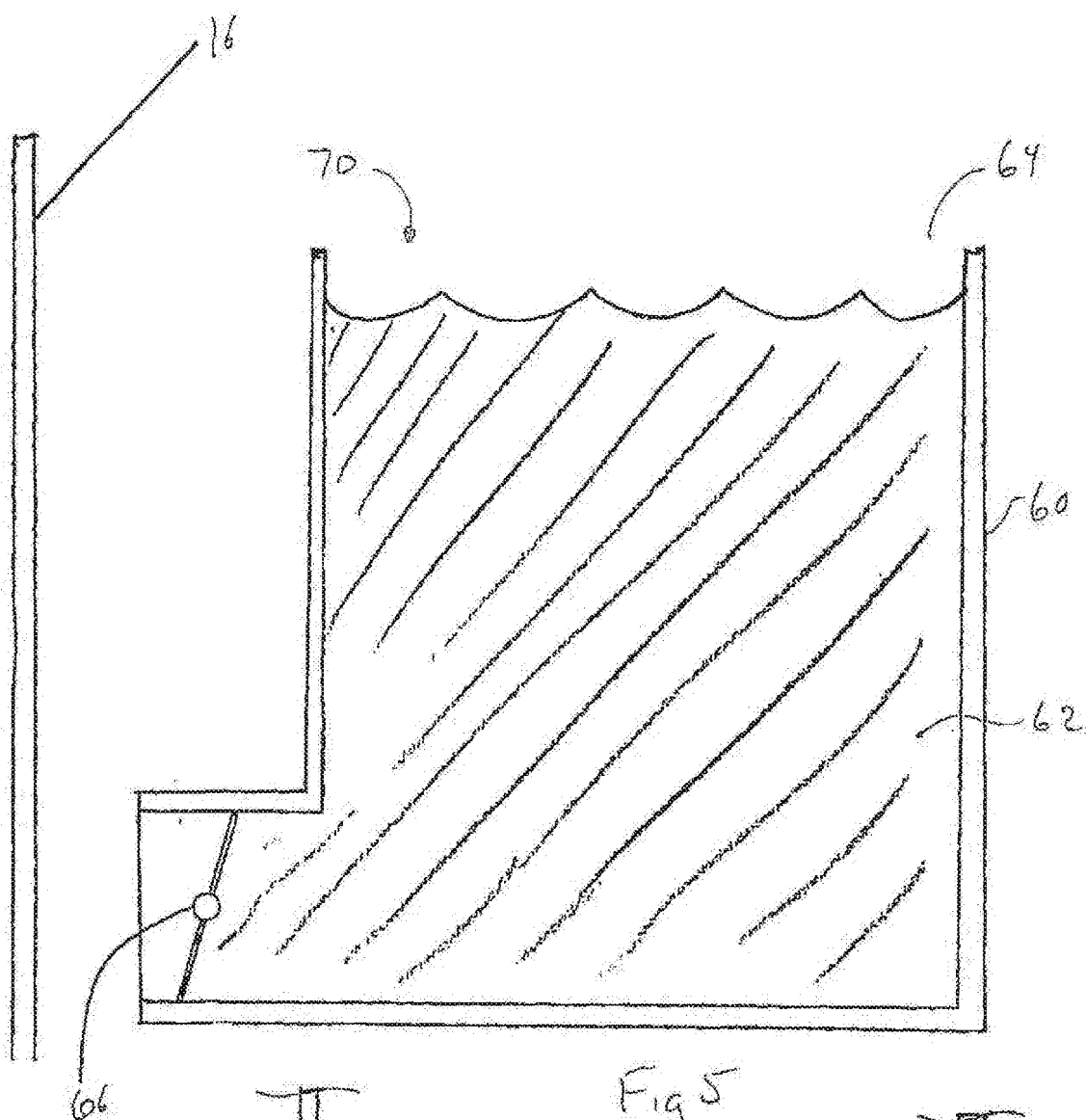
FIG. 5 is a side view of the system of FIG. 1 according to a further embodiment of the present invention at a first or filling position.
Figure 6:
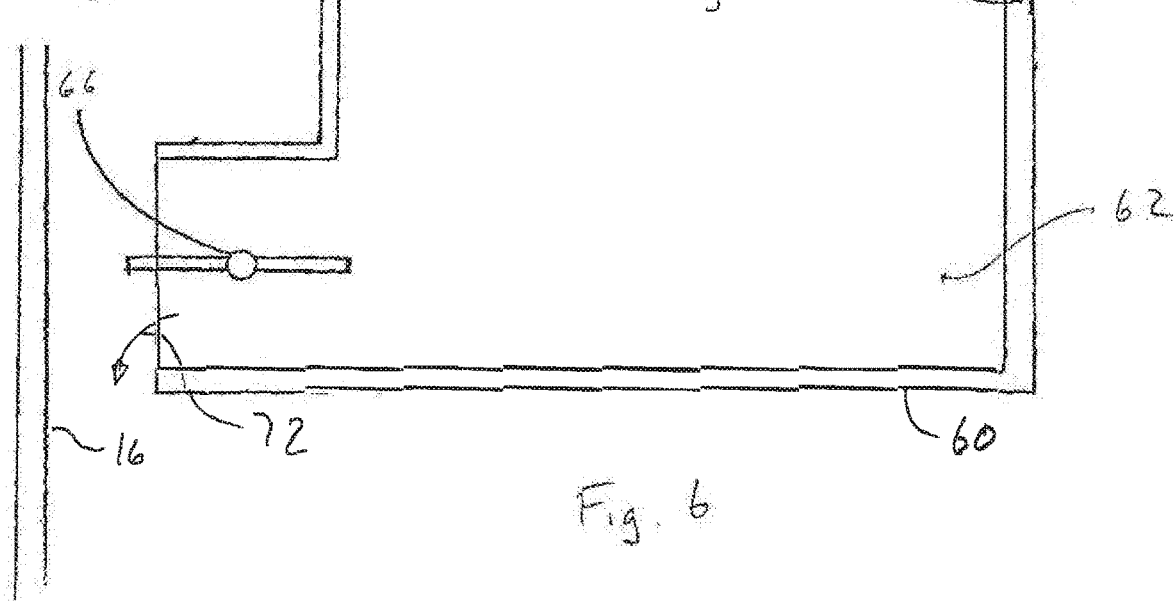
FIG. 6 is a side view of the system of FIG. 1 according to a further embodiment of the present invention at a second or discharge position.

Turning now to FIGS. 5 and 6, an optional design of the reservoir 60 is illustrated. The reservoir 60 as illustrated in FIGS. 5 and 6 comprises an elongate container extending along a direction substantially parallel to the rear wall 16. The reservoir 60 includes an interior volume 62 adapted to receive and retain a quantity of fluid through an open top 64 in a direction generally indicated at 70 in FIG. 2. It will be appreciated that the fluid may also be introduced into the reservoir 60 through a port or orifice in the embodiment illustrated in FIGS. 5 and 6. The reservoir 60 includes a valve or flap 66 proximate to or at the bottom of the reservoir which is closed at a first configuration to retain the fluid within the reservoir 60. The valve 66 may be opened to a second configuration as illustrated in FIG. 6 to discharge the fluid in a direction towards or proximate to the rear wall 16. The valve 66 may be sized to discharge the fluid in a direction generally indicated at 72 towards the rear wall 16 and onto the transition portion 20 and at a rate sufficient to wash or otherwise push any accumulated chips on the receiving surface 12 over the distal edge 15 as set out above.

While specific embodiments have been described and illustrated, such embodiments should be considered illustrative only and not as limiting the disclosure as construed in accordance with the accompanying claims.

What is claimed is:

1. An apparatus for removing debris from under a machining location comprising:
    a static collection surface located below the machining location having a transition portion laterally offset from the machining location; and
    a fluid discharge positioned above the transition portion, the fluid discharge comprising:
        a fluid source; and
        a reservoir having an interior adapted to receive and contain a quantity of a fluid from the fluid source away from debris formed at the machining location for a period of time;
    wherein the fluid discharge is adapted to periodically discharge the fluid therefrom so as to be guided by the transition portion across the collection surface to sweep the debris off of the static collection surface towards a collection point.

2. The apparatus of claim 1 wherein the fluid discharge further comprises
    an actuator operable to transition the reservoir from a first configuration retaining the fluid therein and a second configuration releasing the fluid therefrom.

3. The apparatus of claim 2 wherein the reservoir includes an open top.

4. The apparatus of claim 3 wherein the reservoir includes a pivot support so as to permit the reservoir to be rotated between the first configuration wherein the open top is oriented substantially upward to the second configuration wherein the reservoir is rotated to permit fluid to be discharged through the open top.

5. The apparatus of claim 4 wherein the actuator is operable to rotate the reservoir between the first and second positions.

6. The apparatus of claim 5 wherein the open top of the reservoir is oriented towards the transition portion in the second configuration.

7. The apparatus of claim 2 wherein the fluid discharge comprises
   a port extending through the reservoir wherein the port is closed in the first configuration and open in the second configuration.

8. The apparatus of claim 7 wherein the port includes a valve.

9. The apparatus of claim 1 wherein the transition portion comprises a curved surface.

10. The apparatus of claim 1 wherein the collection surface includes a rear wall extending substantially upward from the transition portion.

11. The apparatus of claim 10 wherein the collection surface includes a bottom portion extending from the transition portion under the machining location.

12. The apparatus of claim 11 wherein the bottom portion extends from the transition surface to a collection location.

13. The apparatus of claim 12 wherein the collection location includes a conveyor therein adapted to remove the debris from the machine enclosure to a distal location for collection.

\* \* \* \* \*